United States Patent
Bradish

(10) Patent No.: US 9,648,577 B1
(45) Date of Patent: May 9, 2017

(54) ADSS ENABLED GLOBAL ROAMING SYSTEM

(71) Applicant: WIRELESS REGISTRY, INC., Washington, DC (US)

(72) Inventor: Stillman Bradish, Washington, DC (US)

(73) Assignee: Wireless Registry, Inc., Washington, DC (US)

( * ) Notice: Subject to any disclaimer, the term of this patent is extended or adjusted under 35 U.S.C. 154(b) by 0 days.

(21) Appl. No.: 14/614,769

(22) Filed: Feb. 5, 2015

Related U.S. Application Data

(60) Provisional application No. 61/938,817, filed on Feb. 12, 2014.

(51) Int. Cl.
  *H04W 60/00* (2009.01)
  *H04W 8/06* (2009.01)
(52) U.S. Cl.
  CPC ............ *H04W 60/00* (2013.01); *H04W 8/06* (2013.01)
(58) Field of Classification Search
  CPC ..... H04W 12/08; H04W 48/16; H04W 84/12; H04W 12/06; H04W 48/14; H04W 88/06; H04W 12/02; H04W 12/04; H04W 12/12; H04W 16/12; H04W 16/14; H04W 24/02; H04W 24/08; H04W 28/08; H04W 28/26; H04W 36/14; H04W 36/22; H04W 48/06; H04W 48/12; H04W 48/18; H04W 48/20; H04W 4/008; H04W 4/02; H04W 60/00; H04W 60/005; H04W 72/02; H04W 72/04; H04W 72/06; H04W 8/205; H04W 8/26; H04L 63/104; H04L 12/5691; H04L 12/5692; H04L 12/5695; H04L 61/2015; H04L 63/083; H04L 63/101; H04L 63/105; H04L 63/108; H04L 63/1416; H04L 63/168
  See application file for complete search history.

(56) References Cited

U.S. PATENT DOCUMENTS 7,580,701 B2 * 8/2009 Ross ..................... H04L 63/104
  455/410
2007/0147318 A1 * 6/2007 Ross ..................... H04L 63/104
  370/338

(Continued)

*Primary Examiner* — Matthew Sams
(74) *Attorney, Agent, or Firm* — Eric L. Sophir; Dentons US LLP

(57) ABSTRACT

Described here is a wireless network management system and methods that may include the use of Authorized Device Specific SSIDs (ADSSs), Access Point Managers, Registries, and Wireless Enabled Devices (WEDs) for providing a roaming service. Systems described here may include access points which may establish connections with WEDs using suitable SSIDs and credentials, where WEDs may attempt to connect to access points broadcasting suitable SSIDs automatically when in range. Access point hardware of use in systems described in the present disclosure may be able to broadcast multiple SSIDs, publicly or hidden, and may form one or more virtual access points (VAPs) perceivable by WEDs in range of the access point. Multi-region access point systems described here include a registry used to store information about services associated with WEDs, and are able to return the information to Access Points in multiple regions to provide service to the WEDs.

2 Claims, 4 Drawing Sheets

(56) References Cited

U.S. PATENT DOCUMENTS

| | | | | |
|---|---|---|---|---|
| 2007/0183375 | A1* | 8/2007 | Tiwari | H04L 63/101 370/338 |
| 2010/0066839 | A1* | 3/2010 | Azuma | G11B 27/034 348/207.1 |
| 2012/0082313 | A1* | 4/2012 | Diamant | H04W 12/02 380/270 |
| 2012/0209934 | A1* | 8/2012 | Smedman | H04L 12/5692 709/208 |
| 2013/0103807 | A1* | 4/2013 | Couto | H04W 12/06 709/220 |
| 2013/0339478 | A1* | 12/2013 | Edge | H04L 67/16 709/217 |
| 2013/0347073 | A1* | 12/2013 | Bryksa | H04L 63/105 726/4 |
| 2014/0029520 | A1* | 1/2014 | Farricker | H04W 16/14 370/329 |
| 2014/0226487 | A1* | 8/2014 | Forssell | H04W 36/22 370/235 |
| 2014/0328190 | A1* | 11/2014 | Lord | H04W 24/08 370/252 |

* cited by examiner

ADSS ENABLED GLOBAL ROAMING SYSTEM

CROSS-REFERENCE TO RELATED APPLICATIONS

This non-provisional patent application claims priority to U.S. Provisional Patent Application No. 61/938,817, entitled "ADSS Enabled Global Roaming System," filed Feb. 12, 2014, which is incorporated herein in its entirety.

TECHNICAL FIELD

The present disclosure relates in general to wireless networking, and more specifically to service roaming systems and methods.

BACKGROUND

Wireless Enabled Devices (WEDs) have seen increasingly widespread use in recent years as consumers have shown a growing interest in accessing content wirelessly. Consumers may use phones, tablets, laptops, and many other devices in a variety of environments and situations, and as the number of users may grow so may the challenges faced in providing a suitable service to each user.

Challenges faced when providing users service may include that of user access when users are away from their usual access points. As users may become used to using WEDs, they may desire or require the use of their WEDS in areas they may not frequent. Often, the user may need to make a request to a third party in order to access to the network, or may not be able to access a network as they may have no account in the new region.

Challenges faced by service providers while granting users network access as they visit other regions may also include the need for establishing protocols to identify and provide access to different users while maintaining a desired degree of network security.

The aforementioned challenges, amongst others, may hinder the effective use of WEDs. There is, then, a continuing need for networking systems and strategies able to provide solutions to one or more of these challenges.

SUMMARY

The systems and methods described herein address the above-discussed shortcomings in the art, and may provide a number of other features as well. The systems and methods described herein are embodiments of a wireless network management that make use of Authorized Device Specific SSIDs (ADSSs), Access Point Managers, Registries, and Wireless Enabled Devices (WEDs) to provide roaming services.

In one embodiment, a computer-implemented method comprises broadcasting, by a wireless access point, a wireless signal containing a first public SSID associated with the access point; receiving, by the access point, a connection request from a wireless device, the connection request containing a wireless identifier associated with the wireless device; querying, by the access point, a registry database using the wireless identifier associated with the wireless device, wherein the registry database stores one or more records of one or more wireless identifiers; transmitting, by the access point, to the wireless device a prompt configured to receive one or more data fields configured to capture registration data, in response to determining the wireless identifier is not associated with a record in the registry database; transmitting, by the access point, to the wireless registry database the registration data received from the wireless device and the first SSID; converting, by the access point, the first public SSID to a first ADSS, wherein the access point conceals broadcasting the first public SSID; and broadcasting, by the access point, a second public SSID associated with the access point.

In another embodiment, a computer-implemented method comprising receiving, by a computer communicatively coupled to a registry database, from a first wireless access point a query containing a wireless identifier, wherein the registry database stores one or more records of one or more wireless identifiers; transmitting, by the computer, to the wireless access point a new identifier indicating the wireless identifier is not associated with a record in the wireless registry; receiving, by the computer, from the wireless access point registration data associated with the wireless identifier and a first SSID; generating, by the computer, a new record for the wireless identifier in the registry database containing the wireless identifier, the registration data, the first SSID, and a level of service indicator; receiving, by the computer, from a second access point a second query containing the wireless identifier; and transmitting, by the computer, to the second access point the first SSID stored in the record of the wireless identifier.

Numerous other aspects, features and benefits of the present disclosure may be made apparent from the following detailed description taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
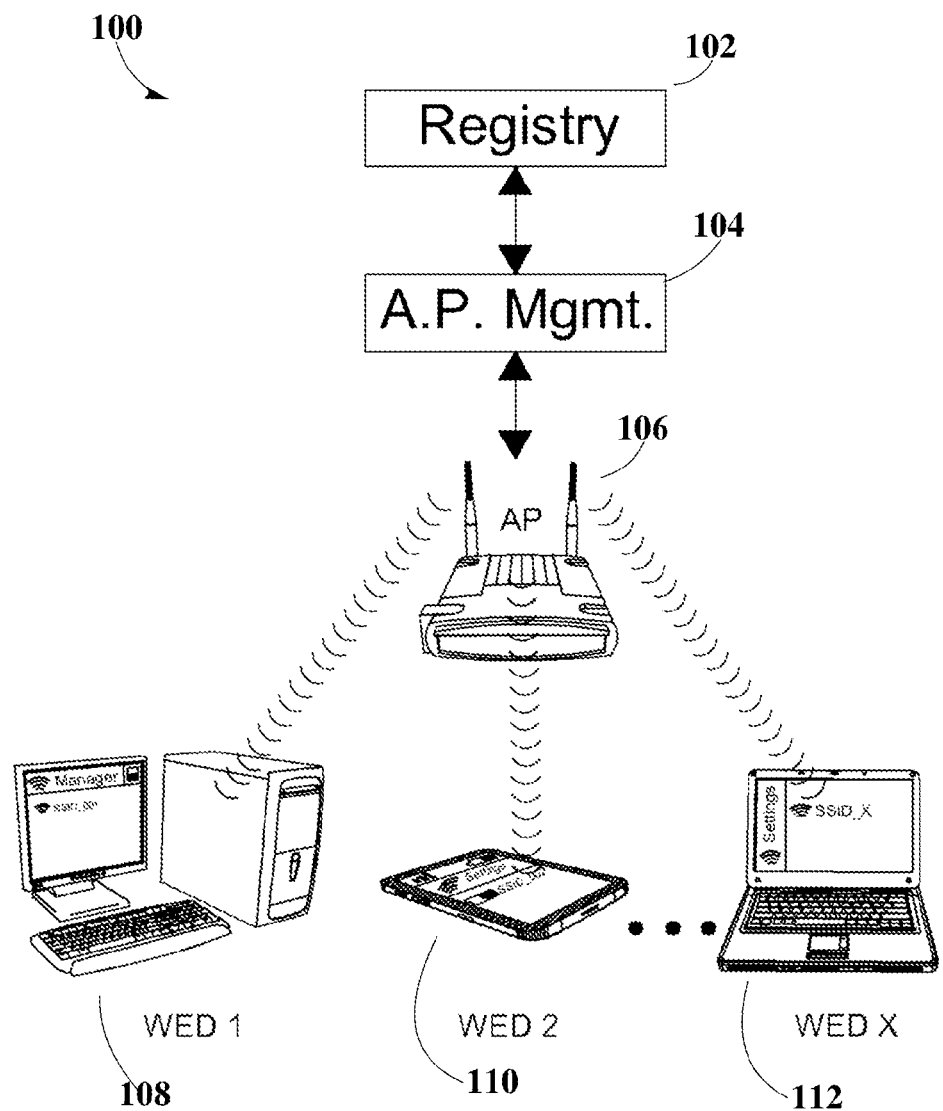
FIG. 1 is a system diagram for an ADSS network including multiple Wireless Enabled Devices, according to an embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

As used here, the following terms may have the following definitions:

"Registry" refers to any component in a system suitable for storing at least one type of information about one or more other components of the system and/or one or more users of the system.

"Wireless Enabled Device", or "WED" refers to any electronic device able to communicate using one or more suitable wireless technologies. Suitable devices may include client devices in wireless networks, which may send out wireless probe signals in order to detect known Access Points. These may be part of one or more suitable wireless technologies, including Wi-Fi, amongst many others.

"Access Point" refers to any device capable of establishing a connection between one or more suitable WEDs within a suitable spatial range and one or more suitable networks.

"Virtual" refers to having the properties of x while not being x. For example, a virtual access point may be an artificial or simulated access point that may be perceived as real by one or more suitable WEDs.

"Service Set Identifier", or "SSID" refers to any identifier suitable for allowing the identification of a wireless network.

"Authorized Device Specific SSID", or "ADSS" refers to any SSID associated with at least one WED authorized for use as a virtual access point.

"Action" refers to any activity able to alter the network experience perceived by a WED or a user of a WED.

"Access Point Manager" refers to any component in a system able to coordinate actions taken by one or more access points.

"Region" refers to one or more defined geographic area belonging to a group of defined geographic areas.

The present disclosure describes wireless network management systems and methods that may include the use of suitable combinations of Authorized Device Specific SSIDs, Access Point Managers, Registries, and Wireless Enabled Devices (WEDs) for providing a roaming service. Embodiments may include access points that may establish connections with wireless enabled devices (WEDs) using suitable SSIDs and credentials, where WEDs may attempt to automatically connect to access points broadcasting suitable SSIDs when in range.

Although the embodiments described herein make reference to Wi-Fi (802.11) communication protocols and information exchanges, it should be appreciated that in other embodiments any wireless communication technology (i.e., hardware, software, and protocols) may be implemented. The access point may use a wireless signal or technology of any type, such as Bluetooth®, Wi-Fi, WiMax, SuperWiFi, LTE systems, LTE Direct, Wi-Fi Direct, or any other wireless signal or technology. Wireless technologies involved in this applications may be any technology that may wirelessly transmit name strings and wirelessly transmit wireless identifiers of any kind (e.g., LTE Direct Expressions and LTE Hardware ID, Universal Unique Identifier (UUID), SSID and MAC). A person having ordinary skill in the art would appreciate that the terms SSID and MAC, as used herein, may be understood as including other wireless technologies (e.g., Bluetooth® names, LTE-Direct Expressions, etc.).

Access point hardware may be able to broadcast multiple SSIDs, where each SSID may be either publicly broadcast or may be hidden, and may form one or more virtual access points (VAPs) perceivable by WEDs in range of the access point. Suitable access point hardware may be able to broadcast multiple SSIDs, where each SSID may be either publicly broadcast or may be hidden. Multiple SSIDs being broadcast by one or more access points may form one or more virtual access points (VAPs) perceivable by WEDs in range of the access point. If the SSID of the VAP and its associated credentials may match an SSID and credential pair previously stored by the WED, the WED may attempt to establish a connection to the VAP.

Registries of use in systems described in the present disclosure may include cloud based registries including information for one or more WEDs, which may be identified using any suitable wireless identifier. Information stored in suitable registries may include MAC addresses of one or more devices, one or more ADSSs associated with one or more devices, credentials associated with one or more ADSSs, and personal information of users associated with one or more devices.

Systems described in the present disclosure may include a suitable access point manager, which may coordinate actions of one or more access points and one or more registries.

In one or more embodiments of systems described in the present disclosure, multiple devices connected to an individual access point may each connect through an ADSS associated to each device, where each ADSS may be unique to the device, and the device may perceive the ADSS as a Virtual Access Point (VAP).

Multi-region Access Point Systems described in the present disclosure may include one or more access points associated with one or more regions where a service may be provided, where the system may include a suitable connected to a suitable cloud through any suitable network infrastructure. In systems described here, the registry may communicate with the one or more access points associated with the one or more regions.

In one or more embodiments, access points in a multi-region access point system may communicate with one or more wireless registries through a cloud, and may provide connectivity to one or more registered WEDs present in the region associated with the access point.

In systems described here, registration may occur through a publicly broadcast SSID that has not been previously associated in a registry, where the SSID string may include a substring associated with the location of the access point and a substring associated with availability in the registry. The registration process may occur when a user initiates a communication request between the WED and the Access Point through the WED. The access point may use a wireless identifier included in the signal transmitted to the access point by the WED to run a query in a wireless registry. If the WED is not registered, the registration process may continue. Otherwise, the system may take actions to provide the WED with a service associated with it in the registry.

In one or more embodiments, having is able to avoid assigning duplicate SSID values to a plurality of WEDs by publicly broadcasting only SSID's it is able to ensure have not been previously associated with a WED.

After registration, the registry may associate the SSID with the WED and record it as an ADSS. The access point may then hide the SSID and provide the WED with service. The system may then broadcast a new public SSID so another WED may undergo a registration process.

In systems described here, access points in a multi-region access point system may automatically transmit an ADSS signal associated with a WED when the access points detect a probe from the WED that has been previously registered in the system.

Authorized Device Specific SSID (ADSS) Networking
Networking Using Service Set Identifiers (SSIDs)
Establishing Connections Using SSIDs Access Points may establish connections with Wireless Enabled Devices (WEDs) using suitable SSIDs, where SSIDs may require the use of a suitable credential, such as a key or password, to establish a connection with the Access Point. In some embodiments, the credentials may be associated with a private network, such as home or office networks. WEDs may store any suitable number of SSIDs in order to establish connections with previously accessed access points, and may attempt to connect to access points broadcasting these SSIDs automatically when in range.

Access Points and Virtual SSIDs

Suitable access point hardware may be able to broadcast multiple SSIDs, where each SSID may be either publicly broadcast or may be hidden. Multiple SSIDs being broadcast by one or more access points may form one or more Virtual Access Points (VAPs) perceivable by WEDs in range of the access point. If the SSID of the VAP and its associated credentials may match an SSID and credential pair previously stored by the WED, the WED may attempt to establish a connection to the VAP.

Access Points may also detect wireless signals emitted by suitable WEDs in range of the Access Point, including probe requests. The Access Point may listen for suitable wireless signals and take a range of actions based on the signals detected. Suitable wireless signals may include information about the WED emitting them, including Wireless identifiers. Suitable wireless identifiers included in suitable wireless signals may include wireless MAC addresses, amongst other identifiers. The Access Point may detect suitable wireless signals and take one or more actions without having established a connection with the WED, having established a connection before detecting suitable wireless signals, having established a connection after detecting suitable wireless signals, or any suitable combination. Other wireless signals from the WED may also be detected by the Access Point and may be used to take one or more actions, or may be used to determine what actions to take.

System Framework

FIG. 1 shows multiple device management system 100, having registry 102, access point manager 104, access point 106, first device 108, second device 110, and xth device 112.

In one or more embodiments of multiple device management system 100, registry 102 may be a cloud based registry including information for one or more WEDs, where individual WEDs may be identified using any suitable wireless identifier, where suitable wireless identifiers may include MAC addresses, amongst others. Information stored in registry 102 may include MAC addresses of one or more devices, one or more ADSSs associated with one or more devices, credentials associated with one or more ADSSs, and personal information of users associated with one or more devices. Registry 102 can be a compilation of records stored on a server, a database, a database associated with a server, or any other computer-readable medium. In the exemplary embodiment, each record is associated with an individual WED.

In one or more embodiments of multiple device management system 100, access point manager 104 may be a component able to communicate with registry 102 and access point 106. Access point manager 104 may coordinate actions of a plurality of access points 106 or a plurality of registries 102. Access point manager 104 can be a server communicatively coupled to the registry 102. Alternatively, the access point manager 104 can be computer program instructions installed and configured to be executed on the access point 106. Access point 106 can be a router, switch, server, or any other computer hardware configured to broadcast wireless communication signals.

In one or more embodiments, access point manager 104 may be a component within access point 106. In one or more other embodiments, access point manager 104 may be included in a device with one or more other suitable components, including registry 102 amongst others.

In one or more embodiments of multiple device management system 100, access point 106 may broadcast a first SSID, through which a first device 108 may establish a connection to a network. Access point 106 may also broadcast a second SSID, through which a second device 110 may establish a connection to a network. Access point 106 may broadcast additional SSIDs, where nth SSID through which xth device 112 may establish a connection to a network. The number of SSIDs access point 106 may broadcast may be related to the number of users connecting to a system, the hardware capacity of access point 106, arbitrary limits established by registry 102 or access point manager 104, or any suitable limiter or requirement.

Figure 2:
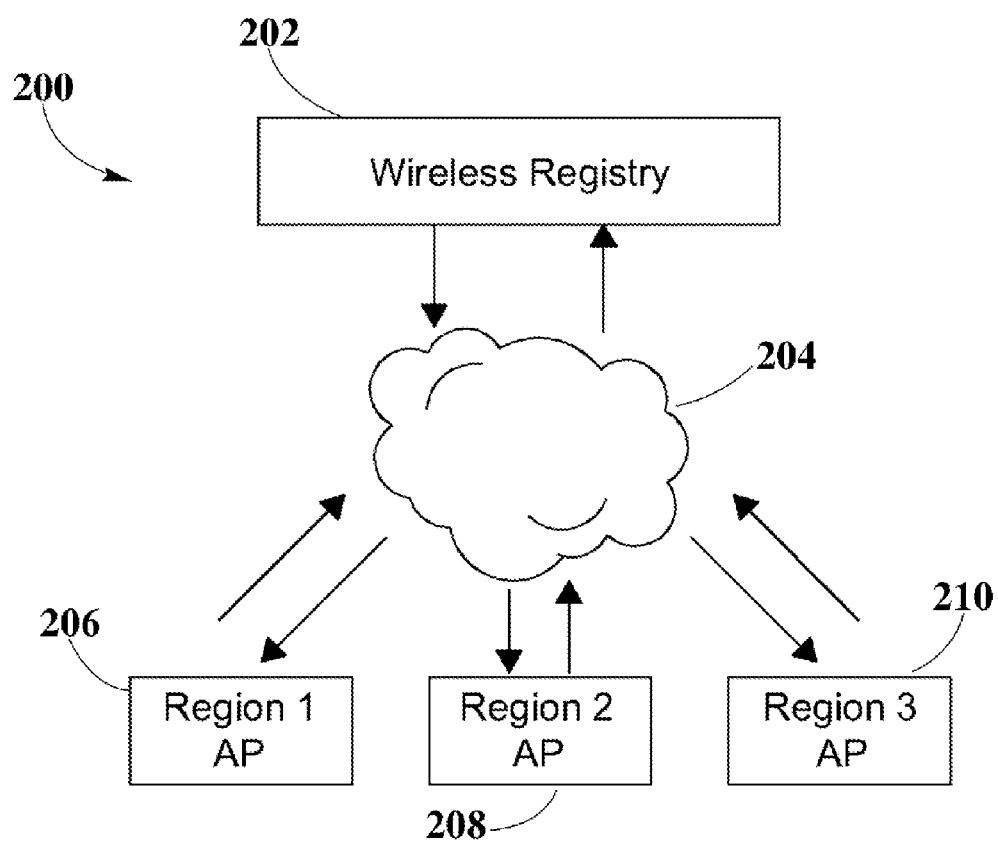
FIG. 2 is a multi-region access point system, according to an embodiment

FIG. 2 shows Multi-region Access Point System 200, including Wireless Registry 202, Cloud 204, First Region Access Point 206, Second Region Access Point 208, and Third Region Access Point 210.

In one or more embodiments, Multi-region Access Point System 200 includes a wireless registry 202, where the wireless registry is connected to a suitable cloud 204 through any suitable network infrastructure. Suitable network infrastructures may include intranets, local area networks (LAN), virtual private networks (VPN), wireless area networks (WAN) and the world wide web, amongst others. The wireless registry may communicate with one or more access points associated with a region, including First Region Access Points 206, Second Region Access Point 208, and Third Region Access Point 210. In one or more embodiments, a Multi-region Access Point System may include any suitable number of regions, where each region may include any suitable number of access points associated with that region.

In one or more embodiments, access points in a multi-region access point system may communicate with one or more wireless registries through a cloud, and may provide connectivity to one or more registered WEDs present in the region associated with the access point.

Figure 3:
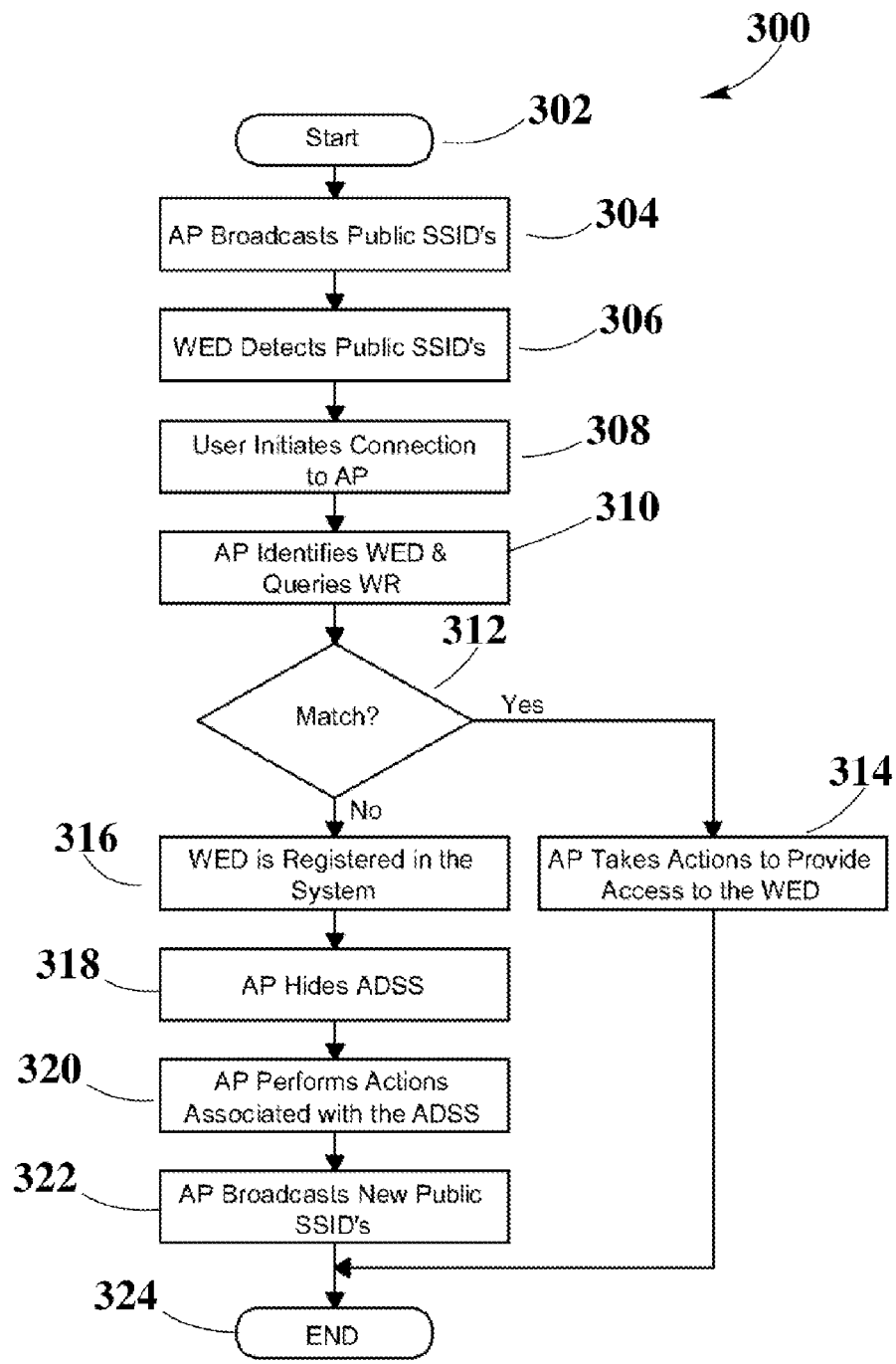
FIG. 3 is a flow chart for granting a WED access to an ADSS, according to an embodiment.

FIG. 3 shows WED Registration Process 300.

The process may Start 302 when AP Broadcasts Public SSID's 304. In this step, an access point publicly broadcasts an SSID, which has not been previously associated in a registry, so that it may be detected by WED's with relative ease. In one or more embodiments, the publicly broadcast SSID may include a string associated with the location of the access point, and a string associated with an available instance of the SSID in the registry. In one or more embodiments, the string associated with the location of the access point may include the name of the establishment the access point is located in, one or more brands associated with the establishment the access point is located in, a string associated with a service provider, a string marketing a product, or any other suitable string. In one or more embodiments, the next available instance of the string in the wireless registry may be represented by an alphanumeric combination, for example establishment_001, establishment_002, establishment a, establishment b, establishment a1, establishment a2, or any other suitable combination.

The process may continue with WED Detects Public SSID's 306. In this step, a WED detects a publicly transmitted SSID. In one or more embodiments, the WED may detect the Public SSID without interacting with a user. In other embodiments, the WED may detect the public SSID when prompted to perform a scan by the user.

The process may then continue when a User Initiates Connection to AP 308. In this step, a WED may present a user with one or more prompts that may allow the user to initiate a connection with an access point. In one or more embodiments, the WED may then send a connection request to the access point through a suitable wireless signal, where the signal may include information about the WED, the user, or a suitable combination.

The process may then continue when an Access Point Identifies WED & Queries Wireless Registry 310. In this step, an access point may process a WED's request to connect and may process information that may identify the WED or the user. In one or more embodiments, the information used to identify the WED or the user may include a suitable wireless identifier included in the signal, such as a MAC address. The access point may then query a wireless registry for information associated with the wireless identifier, where the wireless registry may determine if the identifier and one or more records in the registry Match 312.

If a matching record is found, the Access Point Takes Actions to Provide Service to the WED 314. In this step, the Access Point may take suitable actions to provide a connection service to the WED, as determined by an access point manager. In one or more embodiments, the access point may then send a request to associate the broadcast SSID with the WED, and registering it as an ADSS associated with the WED in the registry before hiding the SSID transmission. In other embodiments, the access point may instead begin broadcasting a hidden SSID associated with the WED and may stop broadcasting the public SSID while the WED connects with the ADSS.

If a matching record is not found, the WED is Registered in the System 316. In this step, the access point may prompt the WED to display one or more prompts to the user to being a registration process so the SSID may be associated with the WED. In one or more embodiments, the prompt may be a website displayed when the user attempts to browse the internet after connecting to the AP. In other embodiments, one or more wireless connection managers on the WED may be able to prompt the user when the connection is initiated. The WED may then prompt the user to accept any number of suitable terms associated with the service, and if the user accepts the terms of service the SSID may be associated with the WED as an ADSS in the registry.

After registration, the process continues when the Access Point hides ADSS 318. In this step, the access point may take any necessary actions to sufficiently hide the newly associated ADSS associated with the user's WED from other WED that may be within range of the access point. In one or more embodiments, the ADSS may be sufficiently hidden when one or more wireless connection managers may not display the ADSS as being broadcast.

The process may continue when the AP performs Actions Associated with the ADSS 320. In this step, the access point may perform any actions associated with providing a desired level of service to the user of the WED. In one or more embodiments, actions may include granting internet access, tracking bandwidth usage, and setting up connection usage policies, amongst others.

The process may continue when the AP Broadcasts New Public SSID's 322. In this step, the access point may begin to broadcast a new publicly broadcast SSID that has not been previously associated with a WED, so that another WED may undergo a WED Registration Process 300, and the process may then End 324.

Figure 4:
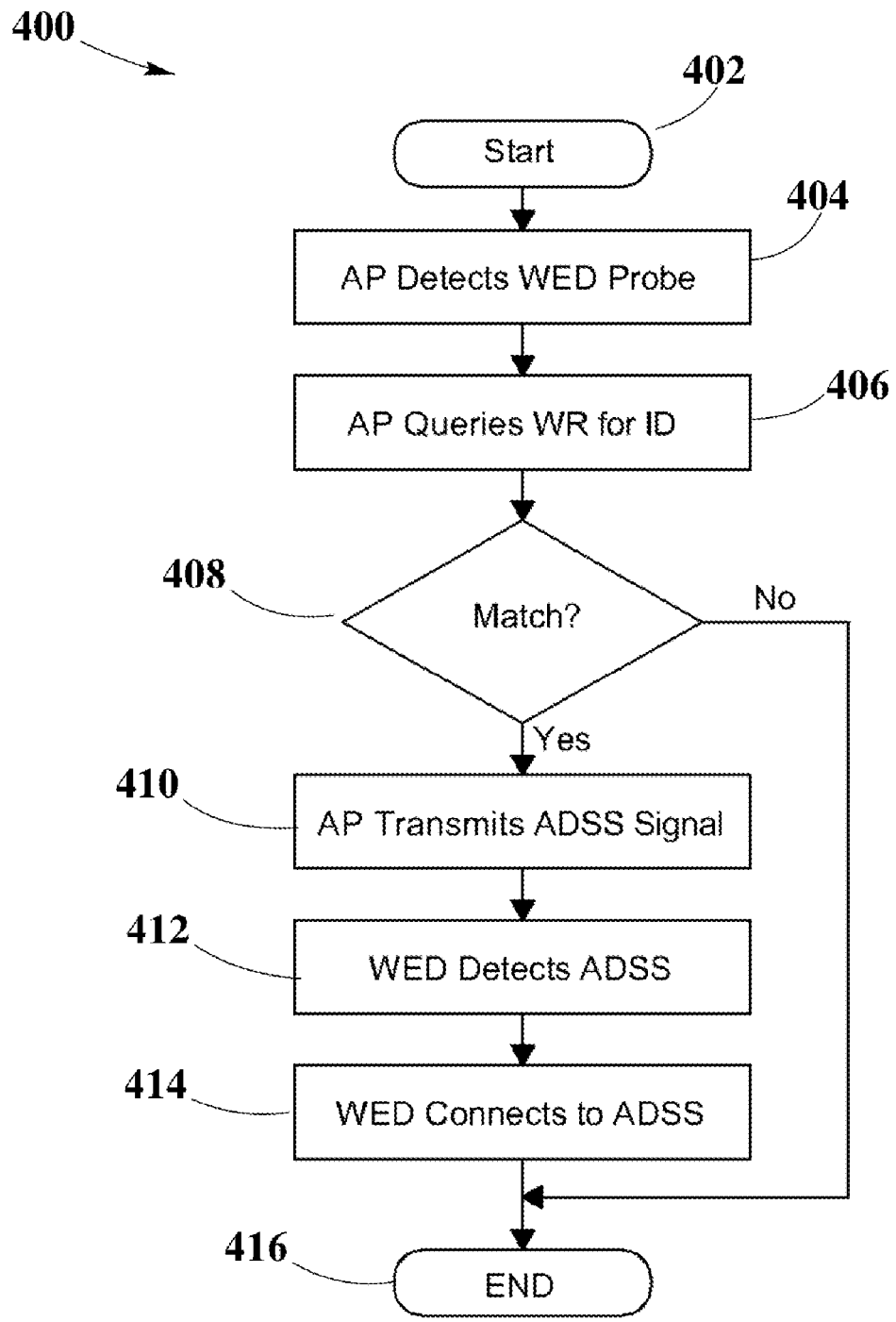
FIG. 4 is a flow chart for registering a device on a roaming system, according to an embodiment.

FIG. 4 shows Automatic ADSS Transmission Process 400.

Automatic ADSS Transmission Process 400 may Start 402 when AP Detects WED Probe 404. In this step, an access point detects a WED when the device transmits a wireless probe while in range of the access point, where the wireless probe includes one or more wireless identifiers associated with the WED. In one or more embodiments, suitable probes may include WiFi probes, Bluetooth probes, LTE Probes, and RF probes, amongst others.

The process may continue when AP Queries Wireless Registry for ID 406. In this step, the access point may query a wireless registry for information associated with the wireless identifier, where the wireless registry may determine if one or more identifiers and one or more records in the registry Match 408.

If the wireless identifier matches a record in the wireless registry, the process may continue as AP Transmits ADSS Signal 410. In this step, the wireless registry returns one or more ADSS's associated with the WED and the access point proceeds to transmit a signal making the ADSS available for the WED to connect. In one or more embodiments, the signal is hidden sufficiently so as not to be displayed when one or more wireless connection managers search for available SSID's.

The process may continue when WED Detects ADSS 412. In this step, the wireless enabled device in range of the access point broadcasting the associated ADSS detects the ADSS signal.

The process may continue when WED Connects to ADSS 414. In this step, the wireless enabled device in range of the access point broadcasting the associated ADSS connects to the network through the ADSS without prompting the user for any action and the process may End 416.

Alternatively, if the wireless identifier does not match a record in the wireless registry, the process may End 416.

Example #1

In this example, a wireless registry database in a first region is in networked-communication with multiple access points in the first region and multiple access points in a second region. A user comes in range of a first access point broadcasting a public SSID in the first region, and then the user uses a WED to initiate communication between the WED and the first access point broadcasting the SSID. The access point then communicates with a wireless registry and determines the WED has not previously been enrolled in the registry. The connection is successful, and when the user attempts to browse the internet the user is shown a prompt to register to the roaming service. The WED presents the terms and conditions of the service to the user, and the user accepts. The access point sends a request to include the WED and SSID combination in the wireless registry, and wireless registry associates the WED's MAC address (or other wireless identifier) with a level of service and the SSID in a database record of the WED. The access point then hides the SSID, which is now considered an ADSS associated with the WED, and the WED is granted internet access. The access point then broadcasts a new public SSID in order to be ready to provide other WED's with the service.

The user then leaves the first region, and travels to the second region. The user's WED may periodically transmit wireless probe signals which include the WED's MAC address, and as the WED comes into range of a second access point in the second region the second access point detects the WED's presence from the probe. The second access point then uses the wireless identifier in the probe to query the wireless registry, and the wireless registry returns a match. The registry then returns the ADSS associated with the WED to the second access point, and the access point begins transmitting the ADSS without broadcasting publicly. The WED then detects the ADSS transmission and automatically connects to the access point through the ADSS, and is granted internet access by the access point. In this example, the terms and conditions include a surcharge for roaming, and the user's account is charged for the internet access.

While various aspects and embodiments have been disclosed, other aspects and embodiments are contemplated. The various aspects and embodiments disclosed are for purposes of illustration and are not intended to be limiting, with the true scope and spirit being indicated by the following claims.

The exemplary embodiments can include one or more computer programs that embody the functions described herein and illustrated in the appended diagrams. However, it should be apparent that there could be many different ways of implementing aspects of the exemplary embodiments in computer programming, and these aspects should not be construed as limited to one set of computer instructions. Further, those skilled in the art will appreciate that one or more acts described herein may be performed by hardware, software, or a combination thereof, as may be embodied in one or more computing systems.

The functionality described herein can be implemented by numerous modules or components that can perform one or multiple functions. Each module or component can be executed by a computer, such as a server, having a non-transitory computer-readable medium and processor. In one alternative, multiple computers may be necessary to implement the functionality of one module or component.

Unless specifically stated otherwise as apparent from the following discussion, it is appreciated that throughout the description, discussions utilizing terms such as "detecting" or "connecting" or "sending" or "determining" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The exemplary embodiments can relate to an apparatus for performing one or more of the functions described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions, and each coupled to a bus.

The exemplary embodiments described herein are described as software executed on at least one server, though it is understood that embodiments can be configured in other ways and retain functionality. The embodiments can be implemented on known devices such as a personal computer, a special purpose computer, cellular telephone, personal digital assistant ("PDA"), a digital camera, a digital tablet, an electronic gaming system, a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to this invention.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

The embodiments described above are intended to be exemplary. One skilled in the art recognizes that numerous alternative components and embodiments that may be substituted for the particular examples described herein and still fall within the scope of the invention.

What is claimed is:

1. A computer-implemented method comprising:
broadcasting, by a wireless access point, a wireless signal containing a first public service set identifier (SSID) associated with the access point;
receiving, by the access point, a connection request from a wireless device, the connection request containing a wireless identifier associated with the wireless device;
querying, by the access point, a registry database using the wireless identifier associated with the wireless device, wherein the registry database stores one or more records of one or more wireless identifiers;
transmitting, by the access point, to the wireless device a prompt configured to receive one or more data fields configured to capture registration data, in response to determining the wireless identifier is not associated with a record in the registry database;
transmitting, by the access point, to the wireless registry database the registration data received from the wireless device and the first SSID;
converting, by the access point, the first public SSID to a first Authorized Device Specific SSID (ADSS) associated with, the wireless device, wherein the access point conceals broadcasting the first public SSID; and
broadcasting, by the access point, a second public SSID associated with the access point,
where the second public SSID is a new publicly broadcast SSID that has not been previously associated with any wireless device in the registry database.

2. A computer-implemented method comprising:
receiving, by a computer communicatively coupled to a registry database and from a first wireless access point, a query containing a wireless identifier of a wireless enabled device, wherein the registry database stores one or more records of one or more wireless identifiers;

transmitting, by the computer and to the first wireless access point, a new identifier indicating the wireless identifier is not associated with a record in the wireless registry;

receiving, by the computer and from the first wireless access point, registration data associated with the wireless identifier and a first service set identifier (SSID) to be associated with the wireless identifier;

generating, by the computer, a record for the wireless identifier in the registry database containing the wireless identifier, the registration data, the first SSID, a first Authorized Device Specific SSID (ADSS) based upon the first SSID, and a level of service indicator;

receiving, by the computer and from a second access point, a second query containing the wireless identifier, the second access point being different from the first wireless access point; and transmitting, by the computer, to the second access point the first ADSS stored in the record of the wireless identifier.

* * * * *